(12) United States Patent
Mori et al.

(10) Patent No.: US 9,209,659 B2
(45) Date of Patent: Dec. 8, 2015

(54) ARMATURE FOR ROTATING ELECTRIC MACHINE

(71) Applicant: DENSO CORPORATION, Kariya, Aichi-pref. (JP)

(72) Inventors: Akio Mori, Chiryu (JP); Kazuhiro Nobata, Chiryu (JP); Masayoshi Yamamoto, Anjo (JP); Yoshiyasu Kozaki, Ichinomiya (JP); Noboru Taniguchi, Kariya (JP); Masayuki Takiguchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/323,682

(22) Filed: Jul. 3, 2014

(65) Prior Publication Data

US 2015/0008785 A1 Jan. 8, 2015

(30) Foreign Application Priority Data

Jul. 5, 2013 (JP) .................. 2013-141614

(51) Int. Cl.
*H02K 3/48* (2006.01)
*H02K 3/52* (2006.01)
*H02K 1/14* (2006.01)

(52) U.S. Cl.
CPC ................ *H02K 3/522* (2013.01); *H02K 1/148* (2013.01)

(58) Field of Classification Search
CPC .................................. H02K 1/06; H02K 1/146
USPC .................... 310/216.069, 216.091, 216.093, 310/216.094, 216.098, 216.103, 216.104, 310/216.114
See application file for complete search history.

(56) References Cited

U.S. PATENT DOCUMENTS

| 911,713 A | * | 2/1909 | Frankenfield ................. 310/265 |
| 2006/0071571 A1 | * | 4/2006 | Groening et al. ............. 310/214 |
| 2011/0025165 A1 | * | 2/2011 | Naganawa et al. .... 310/216.069 |
| 2012/0181893 A1 | | 7/2012 | Ikuta et al. |

FOREIGN PATENT DOCUMENTS

| JP | 56-126141 U | 9/1981 |
| JP | 2003-224940 | 8/2003 |
| JP | 2009-083972 | 4/2009 |
| JP | 2010-239721 | 10/2010 |
| JP | 2012-165630 | 8/2012 |

* cited by examiner

OTHER PUBLICATIONS

Japanese Office Action issued in JP Application No. 2013-141614 dated Apr. 21, 2015 (w/ partial translation).

*Primary Examiner* — Naishadh Desai
(74) *Attorney, Agent, or Firm* — Nixon & Vanderhye P.C.

(57) ABSTRACT

An armature for a rotating electric machine includes an armature core and an armature coil. The armature core includes a substantially annular main body disposed in radial opposition to a field of the machine and teeth extending from the main body radially toward the field. The armature coil is arranged between the teeth of the armature core. For each of the teeth, there are formed a protrusion and a pair of claws at a distal end of the tooth. The protrusion protrudes from a circumferentially central part of the distal end of the tooth radially toward the field. The claws extend, respectively on opposite circumferential sides of the protrusion, from the distal end of the tooth toward the field. Each of the claws has a smaller width at its distal end than at its proximal end and is arcuate-shaped so as to engage with and thereby retain the armature coil.

6 Claims, 12 Drawing Sheets

ROTOR SIDE

ARMATURE FOR ROTATING ELECTRIC MACHINE

CROSS-REFERENCE TO RELATED APPLICATION

This application is based on and claims priority from. Japanese Patent Application No. 2013-141614, filed on Jul. 5, 2013, the content of which is hereby incorporated by reference in its entirety into this application.

BACKGROUND

1. Technical Field

The present invention relates to armatures for rotating electric machines.

2. Description of Related Art

There are known armatures for rotating electric machines which include an armature core and an armature coil. The armature core includes an annular main body and a plurality of teeth each extending radially inward from the main body and spaced from one another in the circumferential direction of the main body. The armature coil is arranged between the teeth of the armature coil.

For example, Japanese Patent Application Publication No. JP2012165630A discloses an armature, in which each of the teeth of the armature core has a protruding part formed at a distal end of the tooth so as to be circumferentially centered at the distal end and a pair of oblique parts formed respectively on opposite circumferential sides of the protruding part. Consequently, with the oblique parts of the teeth of the armature core, it is possible to retain the armature coil in position between the teeth of the armature core, thereby preventing the armature coil from being detached from the teeth.

However, in the armature disclosed in the above patent document, for each of the teeth of the armature core, the oblique parts of the tooth are configured to extend straight parallel to the protruding part of the tooth before the armature coil is arranged between the teeth of the armature core. Further, after the arrangement of the armature coil, the oblique parts are bent respectively in opposite circumferential directions away from the protruding part, thereby being deformed to extend obliquely with respect to the protruding part. Moreover, the oblique parts are also configured to have a constant width from the proximal end to the distal end thereof. Therefore, during the bending of the oblique parts, only proximal end portions of the oblique parts are locally deformed. Consequently, after the bending of the oblique parts, tensile or compressive stress may reside in the proximal end portions of the oblique parts, thereby deteriorating the magnetic properties of the oblique parts. Moreover, the oblique parts may be damaged due to concentration of the tensile or compressive stress on the proximal end portions.

To solve the above problem, the patent document further discloses examples of providing stress relaxation parts in the form of a cut at the proximal ends of the oblique parts, thereby relaxing the residual stress in the proximal end portions of the oblique parts (see FIGS. 8-11 of the patent document). However, with the stress relaxation parts provided at the proximal ends, the width of the oblique parts at the proximal ends is accordingly reduced. Consequently, it may become difficult for magnetic flux to flow through the proximal ends of the oblique parts, thereby lowering the performance of the rotating electric machine.

SUMMARY

According to exemplary embodiments, there is provided an armature for a rotating electric machine. The armature includes an armature core and an armature coil. The armature core includes a substantially annular main body to be disposed in radial opposition to a field of the rotating electric machine and a plurality of teeth each extending from the main body radially toward the field and spaced from one another in a circumferential direction of the main body. The armature coil is arranged between the teeth of the armature core. For each of the teeth of the armature core, there are formed a protrusion and a pair of claws at a distal end of the tooth. The protrusion protrudes from a circumferentially central part of the distal end of the tooth radially toward the field. The claws extend, respectively on opposite circumferential sides of the protrusion, from the distal end of the tooth toward the field. Each of the claws has a smaller width at its distal end than at its proximal end and is arcuate-shaped so as to engage with and thereby retain the armature coil.

Consequently, with the arcuate-shaped claws of the teeth of the armature core, it is possible to retain the armature coil in position between the teeth of the armature core, thereby preventing the armature coil from being detached from the teeth.

Moreover, for each of the claws of the teeth, the width of the claw at the proximal end is larger than that at the distal end. Consequently, it is possible to facilitate the flow of magnetic flux through the proximal ends of the claws, thereby securing high performance of the rotating electric machine.

Furthermore, each of the claws may be configured to extend straight parallel to the protrusion before the armature coil is arranged between the teeth of the armature core. Further, after the arrangement of the armature coil, each of the claws may be bent in the circumferential direction away from the protrusion, thereby being deformed into the arcuate shape. In this case, with the width set to be smaller at its distal end than at its proximal end, it is more difficult for each of the claws to be bent at the proximal end than at the distal end. Consequently, it is possible to prevent that only proximal end portions of the claws are locally deformed during the bending of the claws. Accordingly, it is possible to prevent stress from concentrating on and residing in the proximal end portions of the claws. As a result, it is possible to prevent the claws from being damaged due to concentration of stress on the proximal end portions; it is also possible to prevent the magnetic properties of the claws from being deteriorated due to residual stress in the proximal end portions.

Further, each of the claws may be preferably configured so that before the armature coil is arranged between the teeth of the armature core, the distal end of the claw is positioned farther than a distal end of the protrusion from the main body of the armature core.

The armature core may be preferably formed by laminating a plurality of core pieces, each of which is made of a metal sheet, in an axial direction of the main body.

It is preferable that the protrusion has a distal end surface curved so as to lie in an imaginary cylindrical plane coaxial with the field.

It is also preferable that each of the claws has a distal end portion falling on the imaginary cylindrical plane.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
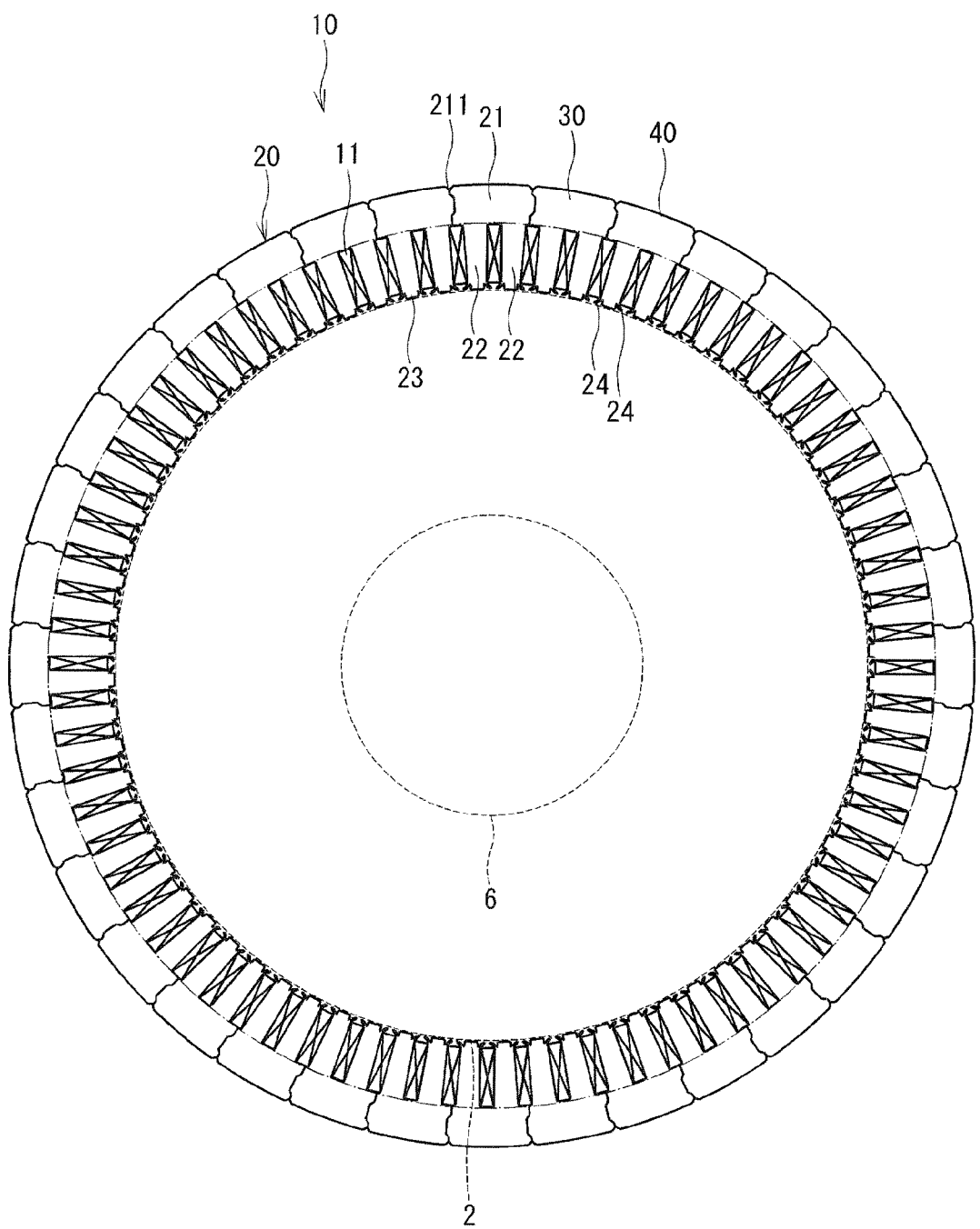
FIG. 1 is a schematic plan view of an armature according to a first embodiment.

Exemplary embodiments will be described hereinafter with reference to FIGS. 1-12. It should be noted that for the sake of clarity and ease of understanding, identical components having identical functions throughout the whole description have been marked, where possible, with the same reference numerals in each of the figures and that for the sake of avoiding redundancy, explanations of the identical components will not be repeated.

First Embodiment

Figure 2:
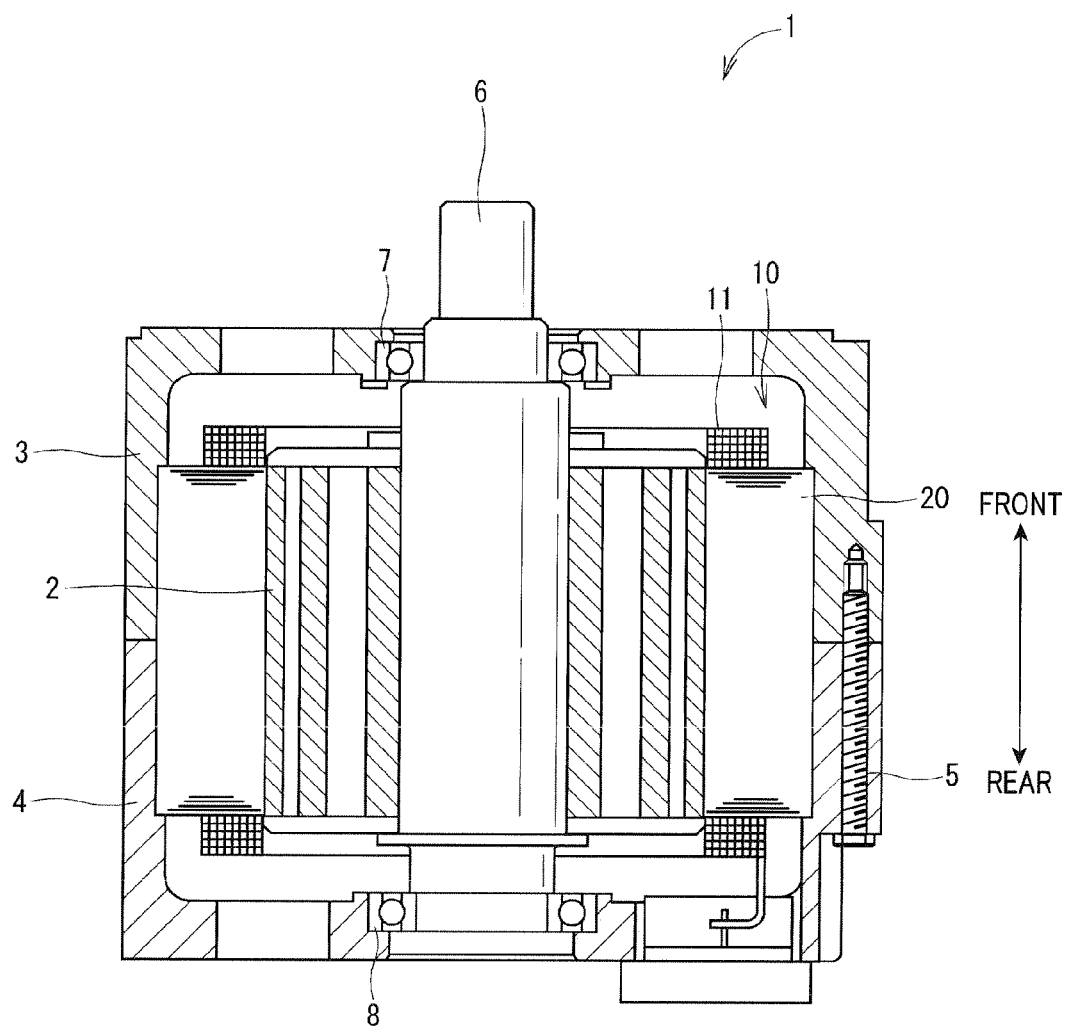
FIG. 2 is a schematic cross-sectional view of a rotating electric machine which includes the armature according to the first embodiment.

FIG. 1 shows the configuration of an armature 10 according to a first embodiment. FIG. 2 shows the overall configuration of a rotating electric machine 1 which employs the armature 10.

The rotating electric machine 1 is configured as, for example, a motor-generator for use in a hybrid vehicle. More specifically, the rotating electric machine 1 can function as an electric motor to drive the drive wheels of the vehicle. Alternatively, the rotating electric machine 1 can function as an electric generator to generate electric power upon receiving torque transmitted from the drive wheels.

As shown in FIG. 2, the rotating electric machine 1 includes a field 2 that is embodied as a rotor in the present embodiment, a front housing 3, a rear housing 4, the armature 10 that is embodied as a stator in the present embodiment, and a rotating shaft 6.

The rotor (i.e., field) 2 is formed, by laminating a plurality of metal sheets (e.g., magnetic steel sheets), into a substantially hollow cylindrical shape. The rotor 2 includes a plurality of permanent magnets that form a plurality of magnetic poles on the radially outer periphery of the rotor 2. The polarities of the magnetic poles alternate between north and south in the circumferential direction of the rotor 2.

Each of the front and rear housings 3 and 4 is made, for example, of a metal material and substantially cup-shaped. The front and rear housings 3 and 4 are arranged to have the open ends thereof abutting each other, thereby forming an internal space therein. Both the rotor 2 and the stator 10 are received in the internal space formed in the front and rear housings 3 and 4. In addition, the front and rear housings 3 and 4 are joined to each other by, for example, a plurality of bolts 5.

The stator 10 has a substantially annular (or substantially hollow cylindrical) shape. The stator 10 is arranged in the internal space formed in the front and rear housings 3 and 4, with the radially outer periphery of the stator 10 fixed to the inner surfaces of circumferential walls of the front and rear housings 3 and 4.

The rotating shaft 6 is provided integrally with the rotor 2 so as to be coaxial with the rotor 2. A front end portion of the rotating shaft 6, which protrudes from the rotor 2 on the front side of the rotor 2, is rotatably supported by the front housing 3 via a bearing 7 provided in the bottom wall of the front housing 3. On the other hand, a rear end portion of the rotating shaft 6, which protrudes from the rotor 2 on the rear side of the rotor 2, is rotatably supported by the rear housing 4 via a bearing 8 provided in the bottom wall of the rear housing 4. Consequently, the rotor 2 can rotate together with the rotating shaft 6 on the radially inside of the stator 10.

That is to say, in the present embodiment, the rotating electric machine 1 is configured as an inner rotor-type rotating electric machine.

In addition, the front end portion of the rotating shaft 6 penetrates the bottom wall of the front housing 3 so as to protrude forward from the front housing 3.

The stator 10 includes a stator core (i.e., armature core) 20 and a stator coil (i.e., armature coil) 11. The stator core 20 is formed, by laminating a plurality of metal sheets (e.g., magnetic steel sheets), into a substantially annular shape. The stator coil 11 is mounted on the stator core 20.

In the present embodiment, the rotating electric machine 1 is configured to selectively operate either in a motor mode or in a generator mode. In the motor mode, electric current is supplied to the stator coil 11, thereby creating a rotating magnetic field in the stator core 20. The rotating magnetic field causes the rotor 2 to rotate together with the rotating shaft 6. Though not shown in the figures, the front end portion of the rotating shaft 6 is mechanically connected to the drive wheels of the vehicle via gears. Consequently, with the rotation of the rotor 2, the drive wheels are driven by torque transmitted from the rotating shaft 6 to rotate. In contrast, in the generator mode, torque is transmitted from the drive wheels of the vehicle to the rotating shaft 6, causing the rotor 2 to rotate together with the rotating shaft 6. Consequently, with the rotation of the rotor 2, electric current is induced in the stator coil 11.

As shown in FIG. 1, the stator core 20 includes a main body 21 and a plurality of teeth 22.

The main body 21 has a substantially annular shape. The main body 21 is disposed radially outside the rotor 2 so as to surround the radially outer periphery of the rotor 2. In other words, the main body 21 is disposed in radial opposition to the rotor (i.e., field) 2.

The teeth 22 each extend from the main body 21 radially inward (i.e., toward the radially outer periphery of the rotor 2) and are spaced from one another in the circumferential direction of the main body 21 at equal intervals. In the present embodiment, the number of the teeth 22 is set to, for example, 72. In addition, it should be noted that in FIG. 1, the circular chain line designates the boundary between the main body 21 and the teeth 22.

Between the teeth 22 of the stator core 20, there is arranged the stator coil 11 which is made of a metal wire (e.g., copper wire).

Figure 6A:
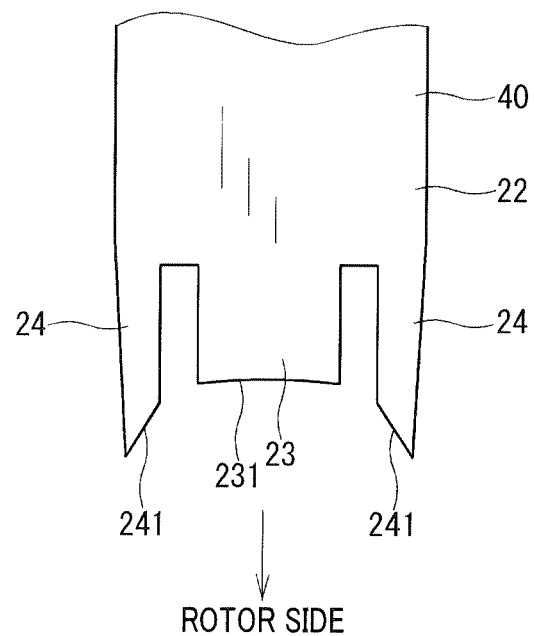
FIG. 6A is a schematic view illustrating distal end portions of teeth of the armature core before bending claws of the teeth.
Figure 6B:
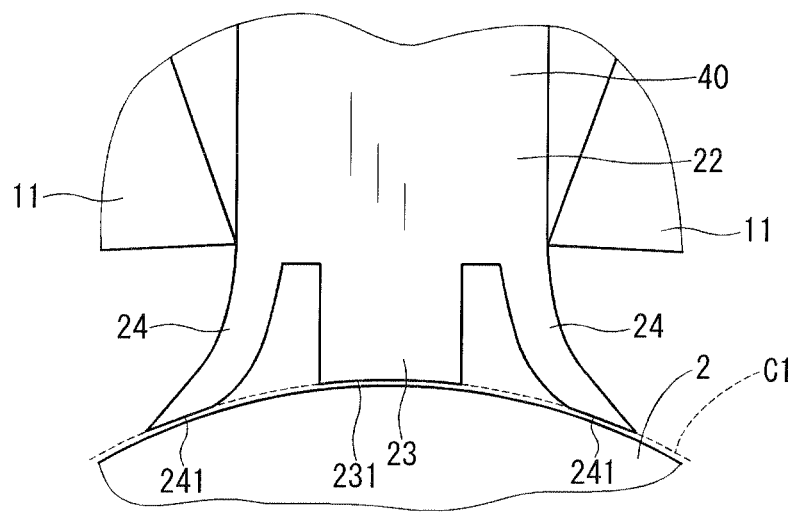
FIG. 6B is a schematic view illustrating the distal end portions of the teeth after bending the claws.

Moreover, in the present embodiment, as shown in FIG. 6B, for each of the teeth 22 of the stator core 20, there are formed a protrusion 23 and a pair of claws 24 at the distal end (i.e., the radially inner end) of the tooth 22.

The protrusion 23 protrudes from a circumferentially central part of the distal end of the tooth 22 radially inward (i.e., toward the radially outer periphery of the rotor 2). In other words, the protrusion 23 is circumferentially centered at the distal end of the tooth 22.

The claws 24 extend respectively from an opposite pair of circumferential end parts of the distal end of the tooth 22 toward the rotor 2. In other words, the claws 24 are formed respectively on opposite circumferential sides of the protrusion 23.

In the present embodiment, each of the claws 24 is configured to have a smaller width at its distal end than at its proximal end. Further, each of the claws 24 is arcuate-shaped so as to engage with and thereby retain the stator coil 11 in the vicinity of the proximal end of the claw 24.

Furthermore, in the present embodiment, as shown in FIG. 6A, each of the claws 24 is configured to extend straight parallel to the protrusion 23 before the stator coil 11 is arranged between the teeth 22 of the stator core 20. Further, as shown in FIG. 6B, after the arrangement of the stator coil 11, each of the claws 24 is bent in the circumferential direction away from the protrusion 23, thereby being deformed into the arcuate shape.

Moreover, in the present embodiment, each of the claws 24 has a side surface 241 that is formed on the protrusion 23 side of the distal end of the claw 24 so as to make the claw 24 taper toward the distal end.

In the present embodiment, as shown in FIG. 6A, each of the claws 24 is configured so that before the stator coil 11 is arranged between the teeth 22 of the stator core 20, in other words, before the claw 24 is bent into the arcuate shape, the distal end of the claw 24 is positioned on the rotor 2 side of the distal end of the protrusion 23. In other words, the distal end of the claw 24 is positioned farther than the distal end of the protrusion 23 from the main body 21 of the stator core 20 (see FIG. 4).

In the present embodiment, as shown in FIG. 6B, the protrusion 23 has a distal end surface 231 that is curved so as to lie in an imaginary cylindrical plane C1; the imaginary cylindrical plane C1 is coaxial with the rotor 2.

Moreover, each of the claws 24 has, after being bent into the arcuate shape, a distal end portion falling (or located) on the imaginary cylindrical plane C1. More particularly, in the present embodiment, each of the claws 24 has, after being bent into the arcuate shape, the side surface 241 thereof lying in the imaginary cylindrical plane C1.

Next, the configuration of the stator core 20 according to the present embodiment will be described in more detail.

Figure 3:
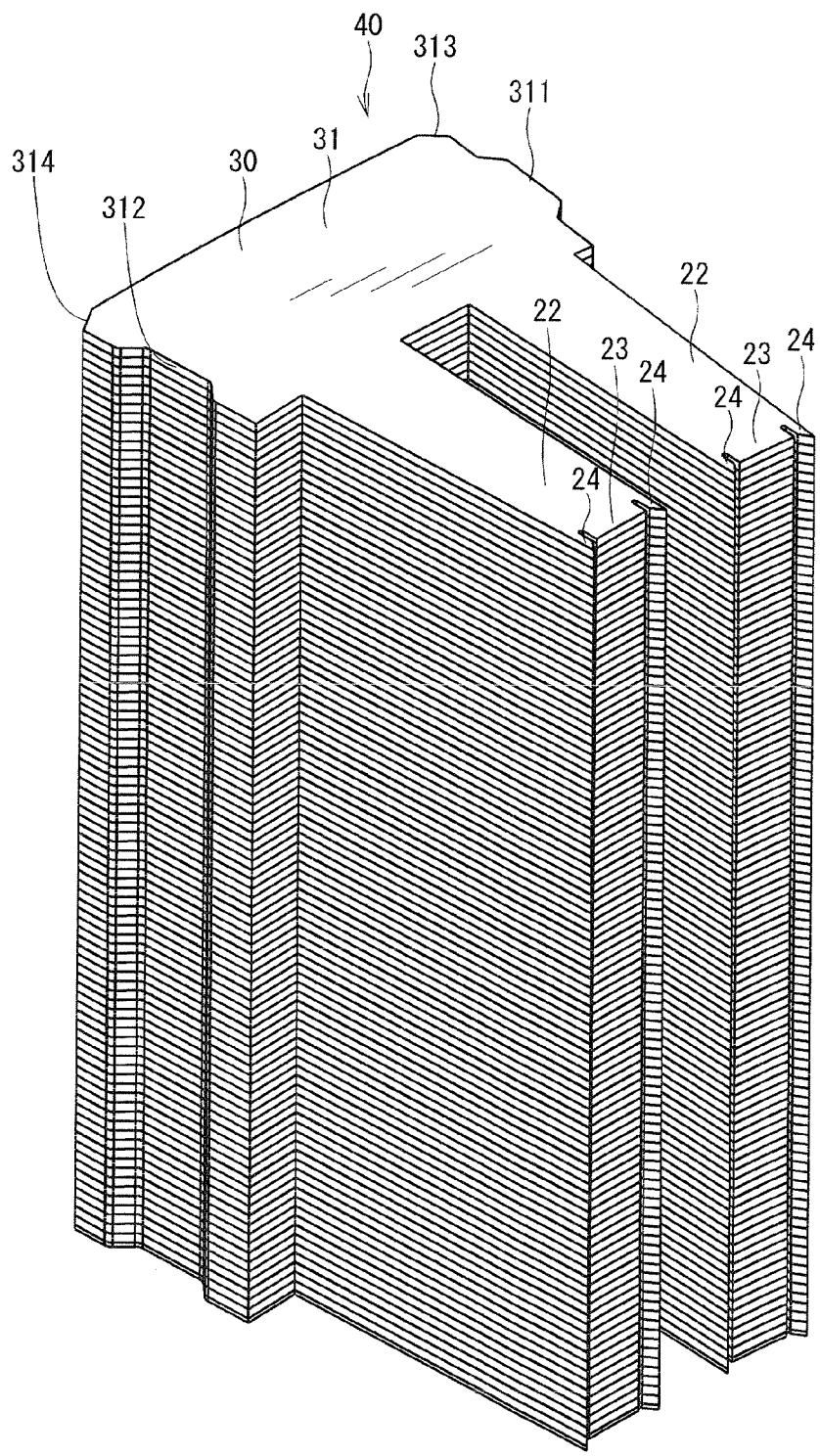
FIG. 3 is a perspective view of one of armature core segments that together make up an armature core of the armature according to the first embodiment.
Figure 4:
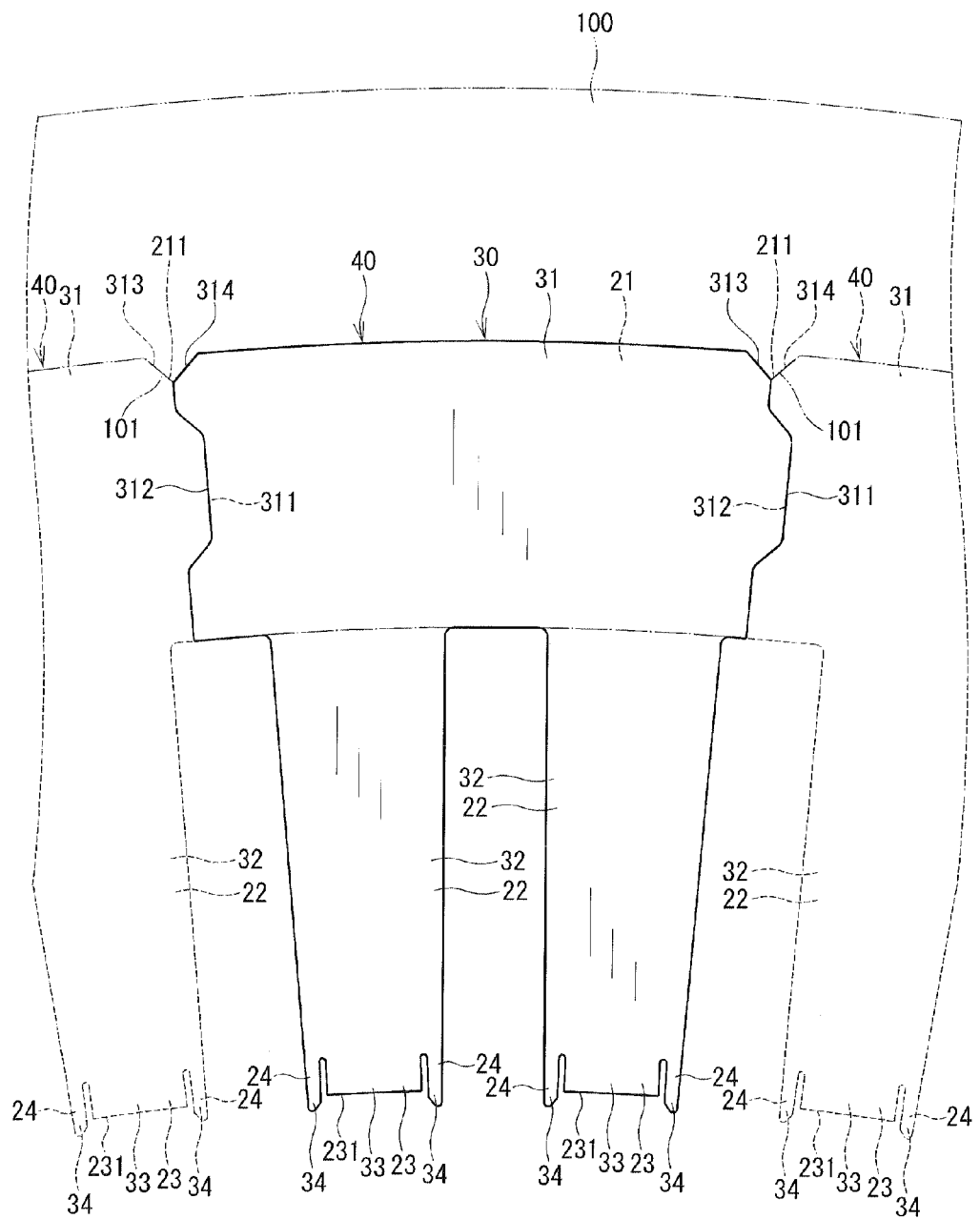
FIG. 4 is a plan view illustrating the configuration of the armature core segments.

The stator core 20 is comprised of a plurality of core segments 40 as shown in FIGS. 3 and 4. The core segments 40 are arranged so as to together form a substantially annular shape with the teeth 22 located radially inside (see FIG. 1). In the present embodiment, the number of the core segments 40 is set to, for example, 36. In addition, it should be noted that FIGS. 3 and 4 illustrate the shape of the core segments 40 before the claws 24 of the teeth 22 are bent into the arcuate shape.

As shown in FIG. 4, each of the core segments 40 is formed by laminating a plurality of core pieces 30. Each of the core pieces 30 is made of a metal sheet (e.g., magnetic steel sheet).

Moreover, each of the core pieces 30 is configured to include a core piece main body 31 and a pair of core piece teeth 32. The core piece main body 31 is substantially arc-shaped. Each of the core piece teeth 32 extends from the core piece main body 31 toward the center of curvature of the core piece main body 31.

In the present embodiment, for each of the core piece teeth 32, there are formed a core piece protrusion 33 and a pair of core piece claws 34 at the distal end of the core piece tooth 32.

The core piece protrusion 33 protrudes from a circumferentially central part of the distal end of the core piece tooth 32 toward the center of curvature of the core piece main body 31.

The core piece claws 34 extend respectively from an opposite pair of circumferential end parts of the distal end of the core piece tooth 32 toward the center of curvature of the core piece main body 31. In other words, the core piece claws 34 are formed respectively on opposite circumferential sides of the core piece protrusion 33.

The core piece main body 31 is configured to include a protrusion 311, a recess 312 and a pair of chamfers 313 and 314.

The protrusion 311 is formed on one circumferential side of the core piece main body 31. The recess 312 is formed in the other circumferential side of the core piece main body 31. The chamfer 313 is formed by beveling, substantially at 45°, a corner portion between the radially outer side of the core piece main body 31 and the one circumferential side of the core piece main body 31 where the protrusion 311 is formed. The chamfer 314 is formed by beveling, substantially at 45°, a corner portion between the radially outer side of the core piece main body 31 and the other circumferential side of the core piece main body 31 where the recess 312 is formed.

After the core pieces 30 are laminated together to form the core segment 40, the core piece teeth 32 of the core pieces 30 together make up the teeth 22 of the core segment 40; the core piece protrusions 33 of the core pieces 30 together make up the protrusions 23 of the core segment 40; the core piece claws 34 of the core pieces 30 together make up the claws 24 of the core segment 40.

Further, after the core segments 40 are assembled together to form the stator core 20, all the core piece main bodies 31 of the core pieces 30 of the core segments 40 together make up the main body 21 of the stator core 20.

In the present embodiment, in assembling the core segments 40 to form the stator core 20, the core segments 40 are arranged to adjoin one another in the circumferential direction of the main body 21 with each of the protrusions 311 of the core piece main bodies 31 fitted into a circumferentially-adjacent one of the recesses 312 of the core piece main bodies 31. Moreover, in the finally obtained stator core 20, circumferentially-adjacent pairs of the chamfers 313 and 314 of the core piece main bodies 31 together make up a plurality of positioning portions 211 of the stator core 20. The positioning portions 211 are formed in the radially outer surface of the main body 21 of the stator core 20 (or the radially outer surfaces of the core segments 40) and have the shape of a notch whose apex angle is substantially equal to 90°.

Next, a method of manufacturing the stator 10 according to the present embodiment will be described.

In the present embodiment, the method includes a core piece forming step, a laminating step, a stator coil forming step, an inserting step, a jig setting step, a bending step and a jig removing step.

In the core piece forming step, the core pieces 30 as shown in FIG. 4 are formed by, for example, performing a pressing process on a magnetic steel sheet.

In the laminating step, the core pieces 30 are laminated in groups to form the core segments 40 as shown in FIG. 3.

Figure 5:
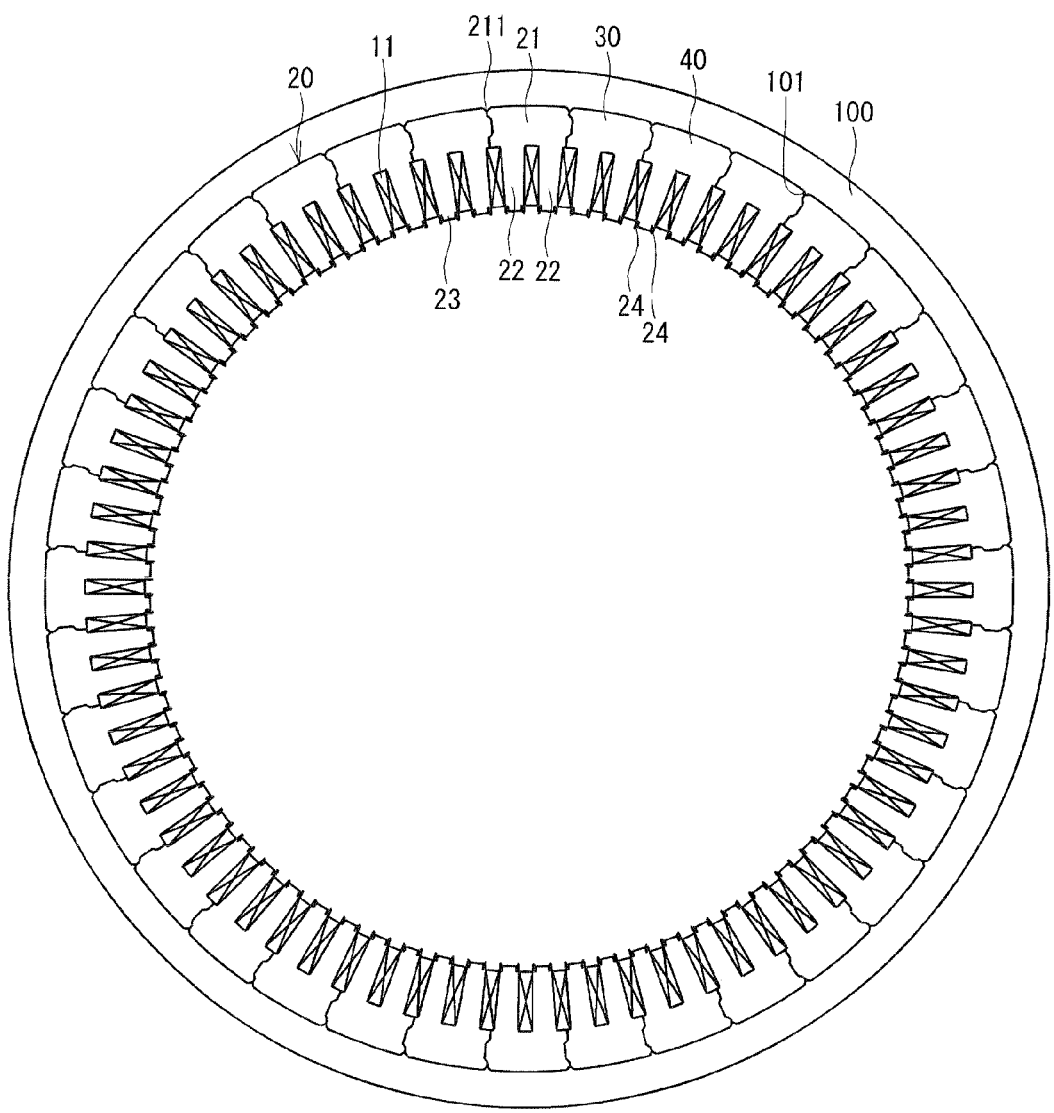
FIG. 5 is a schematic view illustrating a jig placed radially outside the armature core segments in manufacturing the armature according to the first embodiment.

In the stator coil forming step, the stator coil 11 is formed which has a substantially annular shape with a plurality (e.g., 72 in the present embodiment) of void spaces formed therein at equal intervals in the circumferential direction (see FIG. 5).

In the inserting step, the teeth 22 of the core segments 40 are respectively inserted into the void spaces formed in the stator coil 11. At the same time, the core segments 40 are assembled to one another by fitting each of the protrusions 311 of the core piece main bodies 31 into a circumferentially-adjacent one of the recesses 312 of the core piece main bodies 31 (see FIG. 5).

In the jig setting step, a jig 100, which has a substantially annular shape as shown in FIG. 5, is set so as to be located radially outside the core segments 40.

More specifically, as shown in FIG. 4, the jig 100 has a plurality of positioning protrusions 101 formed on a radially inner surface thereof. In the jig setting step, the jig 100 is set (or placed) radially outside the core segments 40 so that each of the positioning protrusions 101 is fitted into a corresponding one of the notch-shaped positioning portions 211 formed in the radially outer surfaces of the core segments 40. Consequently, the core segments 40 are circumferentially positioned with respect to the jig 100.

Figure 7A:
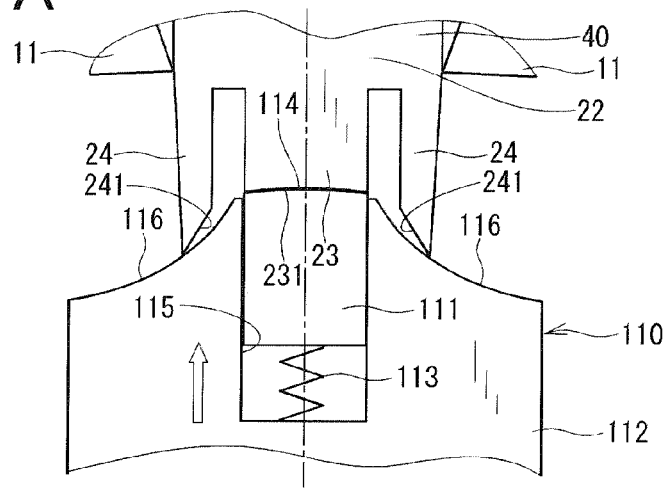
FIGS. 7A-7C are schematic views illustrating a bending step of a method of manufacturing the armature according to the first embodiment.
Figure 7B:
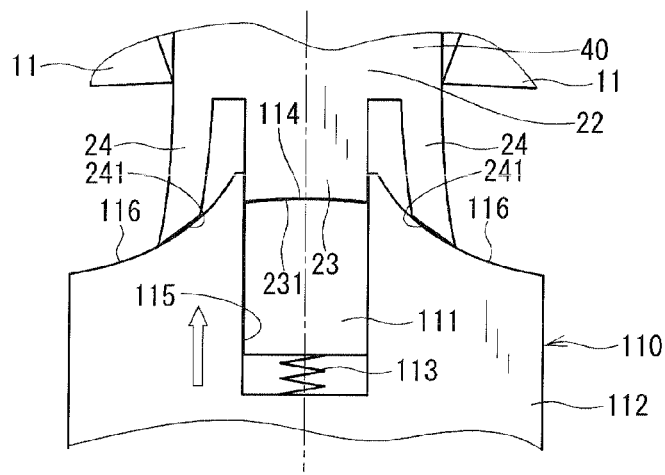
Figure 7C:
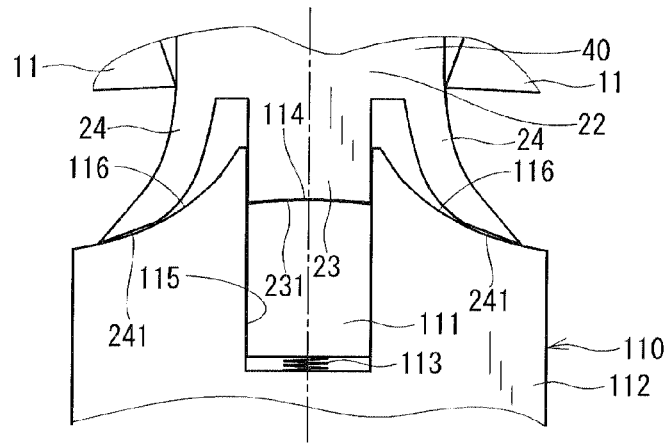

In the bending step, the claws 24 of the teeth 22 of the core segments 40 are bent using a jig 110 as shown in FIGS. 7A-7C.

The jig 110 includes a guiding member 111, a movable member 112 and an urging member 113. The guiding member 111 has a substantially rectangular columnar shape. Further, the guiding member 111 has an end surface 114 adapted to the distal end surfaces 231 of the protrusions 23 of the teeth 22. The movable member 112 has a guide groove 115 formed therein and a pair of curved surfaces 116 formed respectively on opposite sides of the guide groove 115. The movable member 112 is movable relative to the guiding member 111 with the guide groove 115 being guided by the guiding member 111. The urging member 113 is interposed between the guiding member 111 and the bottom surface of the guide groove 115 of the movable member 112, so as to urge the guiding member 111 and the movable member 112 away from each other.

As shown in FIG. 7A, in the bending step, the jig 110 is first set to one of the teeth 22 of the core segments 40 so that: the end surface 114 of the guiding member 111 abuts the distal end surface 231 of the protrusion 23 of the tooth 22; and the curved surfaces 116 of the movable member 112 respectively abut the distal ends of the claws 24 of the tooth 22. In addition, at this time, the core segments 40 are retained by the jig 100 on the opposite side to the teeth 22 with the positioning protrusions 101 of the jig 100 respectively fitted in the positioning portions 211 formed in the radially outer surfaces of the core segments 40 (see FIG. 4).

Then, as shown in FIG. 7B, the movable member 112 is moved toward the tooth 22 while being guided by the guiding member 111. Consequently, the claws 24 of the tooth 22 are gradually bent by the movable member 112, causing the side surfaces 241 of the claws 24 to slide respectively on the curved surfaces 116 of the movable member 112 and the distal ends of the claws 24 to get away from the protrusion 23 of the tooth 22.

As a result, as shown in FIG. 7C, the claws 24 of the tooth 22 are deformed into the arcuate shape, thereby becoming able to retain the stator coil 11 in the vicinities of the proximal ends of the claws 24.

Thereafter, the movable member 112 is moved away from the tooth 22. At this time, with the urging force of the urging member 113, the movable member 112 can be smoothly moved away from the tooth 22.

The above-described bending step is performed for each of the teeth 22 of the core segments 40.

Then, in the subsequent jig removing step, the jig 100 is removed from the core segments 40. In addition, with the stator coil 11 being retained by the claws 24 of the teeth 22, the core segments 40 are kept from being separated from each other after the removal of the jig 100 therefrom.

As a result, the stator 10 according to the present embodiment is finally obtained.

After having described the configuration and the manufacturing method of the stator 10 according to the present embodiment, advantages thereof will be described hereinafter.

In the present embodiment, the stator (i.e., armature) 10 for the rotating electric machine 1 includes the stator core (i.e., armature core) 20 and the stator coil (i.e., armature coil) 11. The stator core 20 includes the substantially annular main body 21 disposed in radial opposition to the rotor (i.e., field) 2 of the rotating electric machine 1 and the teeth 22 each extending from the main body 21 radially inward (i.e., radially toward the field) and spaced from one another in the circumferential direction of the main body 21. The stator coil 11 is arranged between the teeth 22 of the stator core 20. For each of the teeth 22 of the stator core 22, there are formed the protrusion 23 and the pair of claws 24 at the distal end of the tooth 22. The protrusion 23 protrudes from the circumferentially central part of the distal end of the tooth 22 radially inward (i.e., radially toward the field). The claws 24 extend, respectively on opposite circumferential sides of the protrusion 23, from the distal end of the tooth 22 toward the rotor 2 (i.e., toward the field). Each of the claws 24 has a smaller width at its distal end than at its proximal end and is arcuate-shaped so as to engage with and thereby retain the stator coil 11.

Consequently, with the arcuate-shaped claws 24 of the teeth 22 of the stator core 20, it is possible to retain the stator coil 11 in position between the teeth 22 of the stator core 20, thereby preventing the stator coil 11 from being detached from the teeth 22.

Moreover, for each of the claws 24 of the teeth 22, the width of the claw 24 at the proximal end is larger than that at the distal end. Consequently, it is possible to facilitate the flow of magnetic flux through the proximal ends of the claws 24, thereby securing high performance of the rotating electric machine 1.

Furthermore, in the present embodiment, each of the claws 24 is configured to extend straight parallel to the protrusion 23 before the stator coil 11 is arranged between the teeth 22 of the stator core 20. Further, after the arrangement of the stator coil 11, each of the claws 24 is bent in the circumferential direction away from the protrusion 23, thereby being deformed into the arcuate shape. However, with the width set to be smaller at its distal end than at its proximal end, it is more difficult for each of the claws 24 to be bent at the proximal end than at the distal end. Consequently, it is possible to prevent that only proximal end portions of the claws 24 are locally deformed during the bending of the claws 24. Accordingly, it is possible to prevent stress from concentrating on and residing in the proximal end portions of the claws 24. As a result, it is possible to prevent the claws 24 from being damaged due to concentration of stress on the proximal end portions; it is also possible to prevent the magnetic properties of the claws 24 from being deteriorated due to residual stress in the proximal end portions.

In the present embodiment, each of the claws 24 is configured so that before the stator coil 11 is arranged between the teeth 22 of the stator core 20, the distal end of the claw 24 is positioned farther than the distal end of the protrusion 23 from the main body 21 of the stator core 20.

With the above configuration, it is possible to easily and smoothly bend each of the claws 24 into the arcuate shape.

In the present embodiment, the stator core 20 is formed by laminating the core pieces 30 in the axial direction of the main body 21; each of the core pieces 30 is made of, for example, a magnetic steel sheet.

Consequently, it is possible to easily shape each of the core pieces 30 into the desired shape as shown in FIG. 4. As a result, it is possible to easily form the stator core 20 which has such a complicated shape as including the protrusion 23 and the claws 24 at the distal end of each of the teeth 22.

In the present embodiment, each of the protrusions 23 of the teeth 22 of the stator core 20 has the distal end surface 231 that is curved so as to lie in the imaginary cylindrical plane C1; the imaginary cylindrical plane C1 is coaxial with the rotor (i.e., field) 2.

With the above configuration, it is possible to facilitate the flow of magnetic flux between the protrusions 23 of the teeth 22 of the stator core 20 and the rotor 2, thereby improving the performance of the rotating electric machine 1.

Moreover, in the present embodiment, each of the claws 24 of the teeth 22 of the stator core 20 has its distal end portion falling on the imaginary cylindrical plane C1.

With the above configuration, it is possible to facilitate the flow of magnetic flux between the claws 24 of the teeth 22 of the stator core 20 and the rotor 2, thereby further improving the performance of the rotating electric machine 1.

Second Embodiment

Figure 8A:
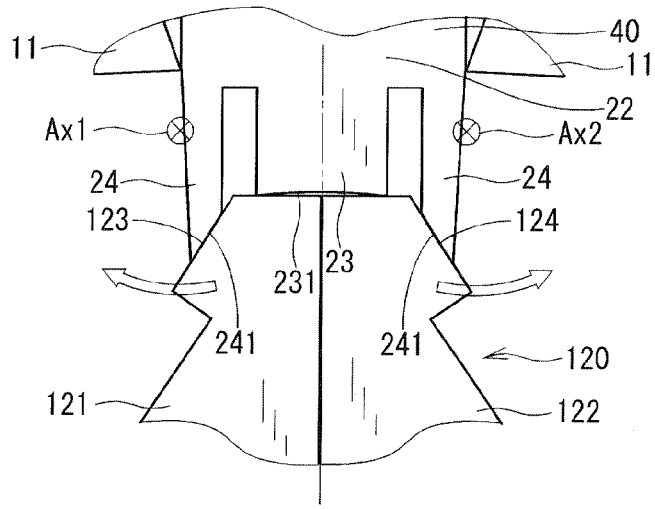
FIGS. 8A-8C are schematic views illustrating a bending step according to a second embodiment.
Figure 8B:
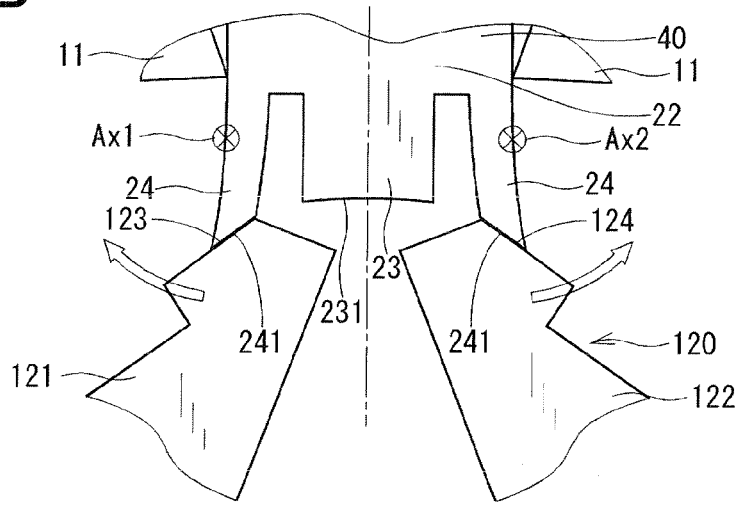
Figure 8C:
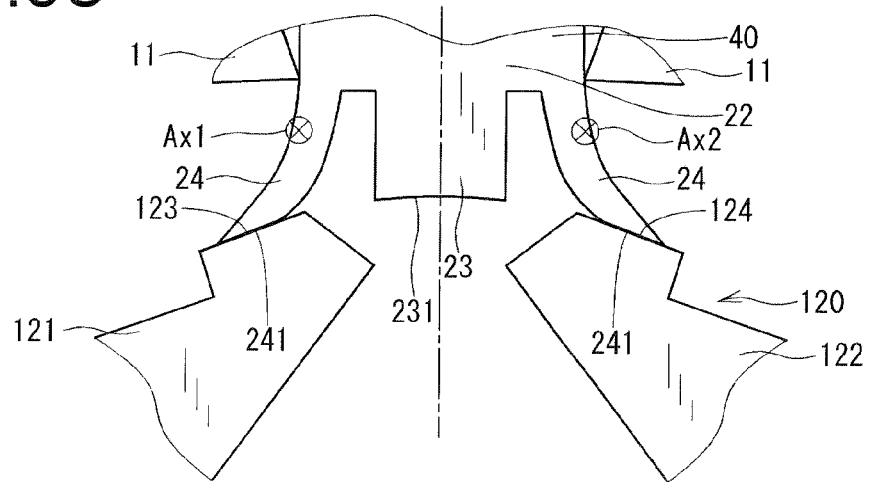

In this embodiment, in the bending step of the method of manufacturing the stator 10, a jig 120 as shown in FIGS. 8A-8C is used instead of the jig 110 used in the first embodiment.

Specifically, in the bending step, for each of the teeth 22 of the core segments 40, the jig 120 is used to bend both the claws 24 of the tooth 22 at the same time.

The jig 120 includes a pair of first and second rotating members 121 and 122. The first rotating member 121 has a side surface 123 adapted to the side surface 241 of one of the two claws 24 of the tooth 22, while the second rotating member 122 has a side surface 124 adapted to the side surface 241 of the other claw 24. Further, the first rotating member 121 is rotatable about a first axis of rotation Ax1, while the second rotating member 122 is rotatable about a second axis of rotation Ax2.

As shown in FIG. 8A, in the bending step, the jig 120 is first set to the tooth 22 so that: the first and second rotating members 121 and 122 of the jig 120 abut each other; the side surface 123 of the first rotating member 121 abuts the side surface 241 of the one of the two claws 24 of the tooth 22; and the side surface 124 of the second rotating member 122 abuts the side surface 241 of the other claw 24. In addition, at this time, the core segments 40 are retained by the jig 100 on the opposite side to the teeth 22 with the positioning protrusions 101 of the jig 100 respectively fitted in the positioning portions 211 formed in the radially outer surfaces of the core segments 40 (see FIG. 4).

Then, as shown in FIG. 8B, the first and second rotating members 121 and 122 are rotated respectively about the first axis of rotation Ax1 and the second axis of rotation Ax2 so as to make the first and second rotating members 121 and 122 get away from each other. Consequently, the one claw 24, whose side surface 241 abuts the side surface 123 of the first rotating member 121, is gradually bent by the first rotating member 121, causing the distal end of the one claw 24 to recede from the protrusion 23 of the tooth 22. At the same time, the other claw 24, whose side surface 241 abuts the side surface 124 of the second rotating member 122, is gradually bent by the second rotating ember 122, causing the distal end of the other claw 24 to recede from the protrusion 23 of the tooth 22.

As a result, as shown in FIG. 8C, both the claws 24 of the tooth 22 are deformed into the arcuate shape, thereby becoming able to retain the stator coil 11 in the vicinities of the proximal ends of the claws 24.

Thereafter, the first and second rotating members 121 and 122 are rotated back to abut each other again, and then the jig 120 is removed from the tooth 22.

In the present embodiment, with the jig 120, it is possible to achieve the same advantageous effects as with the jig 110 in the first embodiment.

In addition, the jig 110 used in the first embodiment requires a smaller working space than and is thus preferable to the jig 120 used in the present embodiment.

Third Embodiment

This embodiment illustrates core segments 40 which are similar to those according to the first embodiment; accordingly, only the differences therebetween will be described hereinafter.

In the first embodiment, as described previously, each of the core pieces 30 has the pair of chamfers 313 and 314 formed respectively at opposite circumferential ends of the radially outer side of the core piece main body 31. Moreover, in the finally obtained stator core 20, circumferentially-adjacent pairs of the chamfers 313 and 314 of the core piece main bodies 31 together make up the positioning portions 211 each of which has the shape of a notch whose apex angle is substantially equal to 90° (see FIG. 4).

Figure 9:
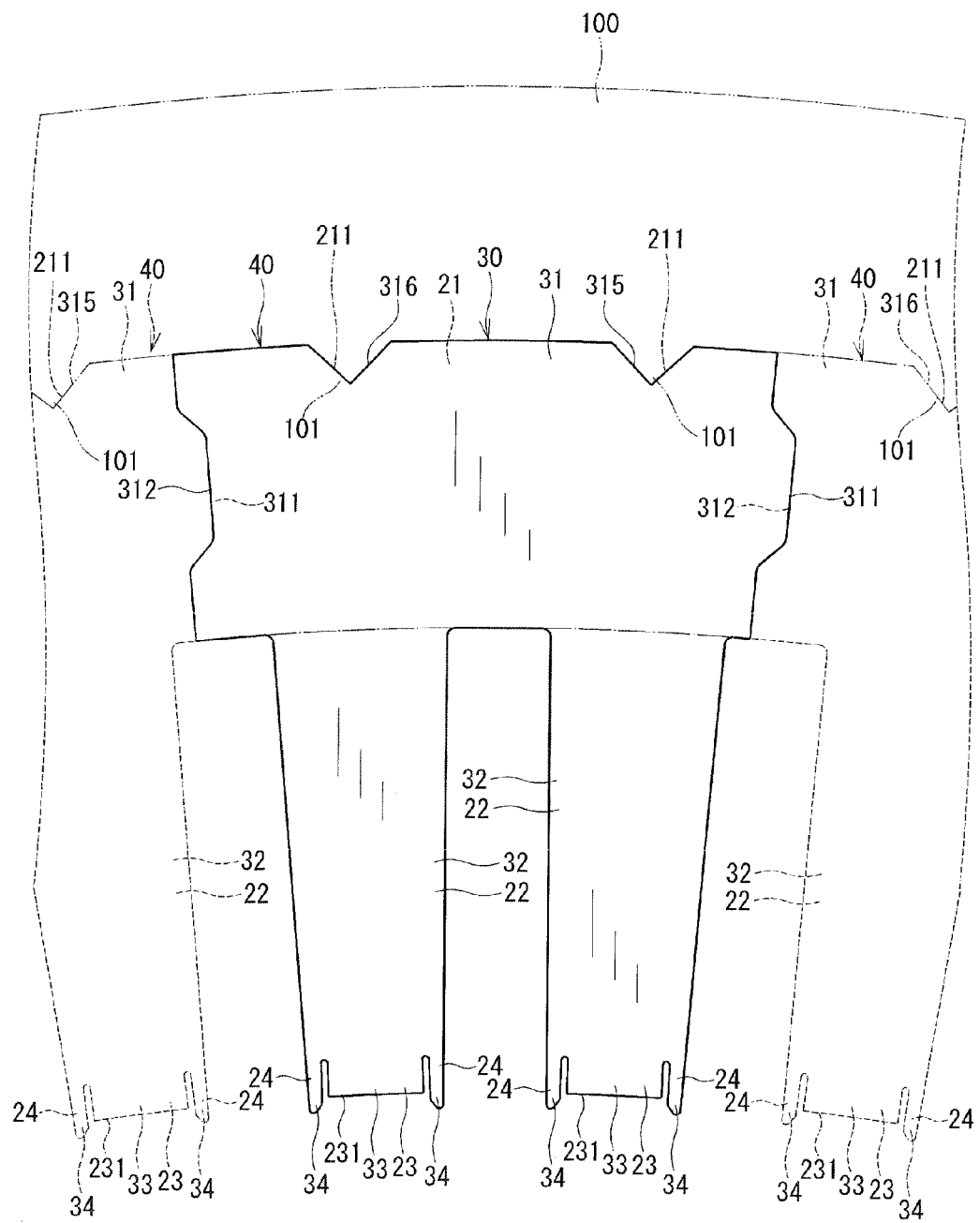
FIG. 9 is a plan view illustrating the configuration of armature core segments according to a third embodiment.

In comparison, in the present embodiment, as shown in FIG. 9, each of the core pieces 30 has a pair of notches 315 and 316 instead of the pair of chamfers 313 and 314. Each of the notches 315 and 316 is formed in the radially outer side of the core piece main body 31 so as to have an apex angle of substantially 90°. Moreover, the notches 315 and 315 are both formed away from the circumferential ends of the core piece main body 31 and spaced from each other by a predetermined interval. Consequently, after the core pieces 30 are laminated in groups to form the core segments 40 and the core segments 40 are assembled together to form the stator core 20, all the notches 315 and 316 of the core pieces 30 together make up a plurality of positioning portions 211 of the stator core 20. The positioning portions 211 are formed in the radially outer surface of the main body 21 of the stator core 20 (or the radially outer surfaces of the core segments 40) and have the shape of a notch whose apex angle is substantially equal to 90'.

Moreover, in the present embodiment, in the jig setting step of the method of manufacturing the stator 10, the jig 100 is set (or placed) radially outside the core segments 40 so that each of the positioning protrusions 101 of the jig 100 is fitted into a corresponding one of the notch-shaped positioning portions 211 formed in the radially outer surfaces of the core segments 40. Consequently, the core segments 40 are circumferentially positioned with respect to the jig 100 (see FIG. 9).

Furthermore, in the present embodiment, in the bending step of the method of manufacturing the stator 10, the core segments 40 are retained by the jig 100 on the opposite side to the teeth 22 with the positioning protrusions 101 of the jig 100 respectively fitted in the positioning portions 211 formed in the radially outer surfaces of the core segments 40 (see FIG. 9).

With the above-described core segments 40 according to the present embodiment, it is possible to achieve the same advantageous effects as with the core segments 40 according to the first embodiment.

Fourth Embodiment

Figure 10:
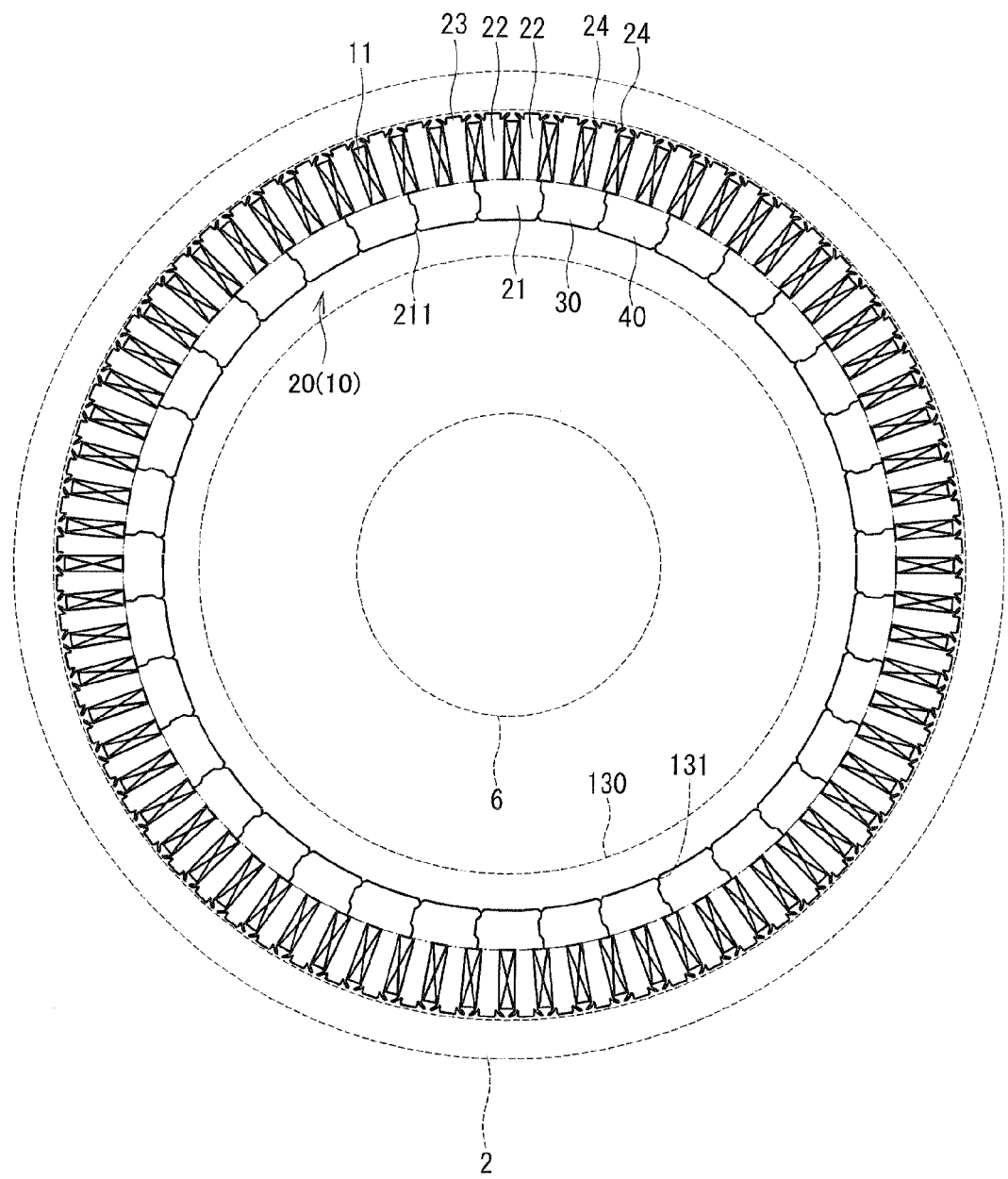
FIG. 10 is a schematic plan view of an armature according to a fourth embodiment.

FIG. 10 shows the configuration of a stator (i.e., armature) 10 according to a fourth embodiment.

In the present embodiment, the stator 10 has a substantially annular (or substantially hollow cylindrical) shape. The stator 10 is fixed to the front housing 3 or the rear housing 4, both of which are not shown in the figures.

The rotor (i.e., field) 2 also has a substantially annular (or substantially hollow cylindrical) shape. The rotor 2 is journaled by the front and rear housings 3 and 4 via the rotating shaft 6, so as to rotate together with the rotating shaft 6. The rotor 2 is disposed radially outside the stator 10 so as to surround the radially outer periphery of the stator 10.

That is to say, in the present embodiment, the rotating electric machine 1 is configured as an outer rotor-type rotating electric machine.

Moreover, in the present embodiment, as shown in FIG. 10, the stator core 20 includes a main body 21 and a plurality of teeth 22.

The main body 21 has a substantially annular shape. The main body 21 is disposed radially inside the rotor 2 so as to be surrounded by the rotor 2. In other words, the main body 21 is disposed in radial opposition to the rotor (i.e., field) 2.

The teeth 22 each extend from the main body 21 radially outward (i.e., toward the radially inner periphery of the rotor 2) and are spaced from one another in the circumferential direction of the main body 21 at equal intervals. In the present embodiment, the number of the teeth 22 is set to, for example, 72. In addition, it should be noted that in FIG. 10, the circular chain line designates the boundary between the main body 21 and the teeth 22.

Between the teeth 22 of the stator core 20, there is arranged the stator coil 11 which is made of a metal wire (e.g., copper wire).

Figure 11A:
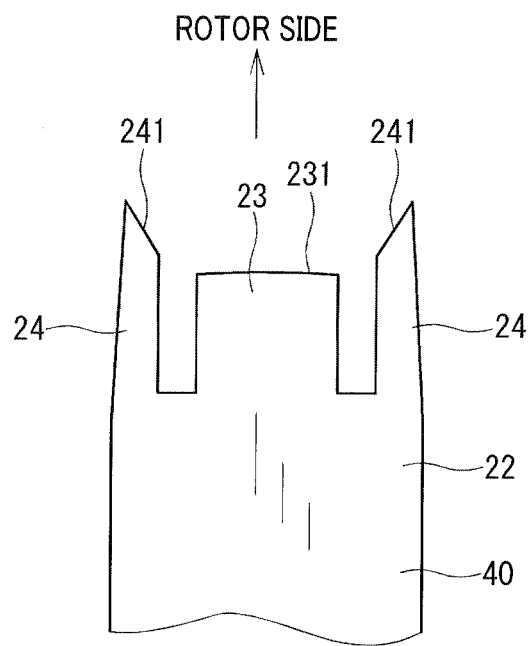
FIG. 11A is a schematic view illustrating distal end portions of teeth of an armature core of the armature according to the fourth embodiment before bending claws of the teeth.
Figure 11B:
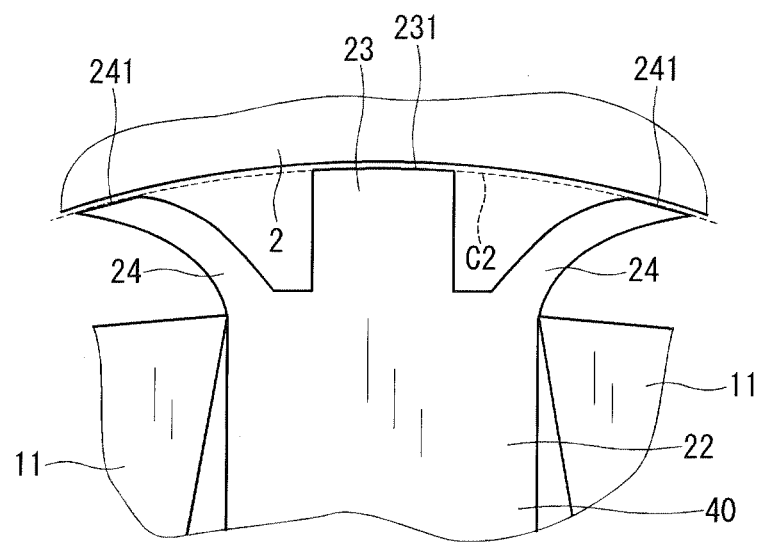
FIG. 11B is a schematic view illustrating the distal end portions of the teeth shown in FIG. 11A after bending the claws.

Furthermore, in the present embodiment, as shown in FIG. 11B, for each of the teeth 22 of the stator core 20, there are formed a protrusion 23 and a pair of claws 24 at the distal end (i.e., the radially outer end) of the tooth 22.

The protrusion 23 protrudes from a circumferentially central part of the distal end of the tooth 22 radially outward (i.e., toward the radially inner periphery of the rotor 2). In other words, the protrusion 23 is circumferentially centered at the distal end of the tooth 22.

The claws 24 extend respectively from an opposite pair of circumferential end parts of the distal end of the tooth 22 toward the rotor 2. In other words, the claws 24 are formed respectively on opposite circumferential sides of the protrusion 23.

In the present embodiment, each of the claws 24 is configured to have a smaller width at its distal end than at its proximal end. Further, each of the claws 24 is arcuate-shaped so as to engage with and thereby retain the stator coil 11 in the vicinity of the proximal end of the claw 24.

Furthermore, in the present embodiment, as shown in FIG. 11A, each of the claws 24 is configured to extend straight parallel to the protrusion 23 before the stator coil 11 is arranged between the teeth 22 of the stator core 20. Further, as shown in FIG. 11B, after the arrangement of the stator coil 11, each of the claws 24 is bent in the circumferential direction away from the protrusion 23, thereby being deformed into the arcuate shape.

Moreover, in the present embodiment, each of the claws 24 has a side surface 241 that is formed on the protrusion 23 side of the distal end of the claw 24 so as to make the claw 24 taper toward the distal end.

In the present embodiment, as shown in FIG. 11A, each of the claws 24 is configured so that before the stator coil 11 is arranged between the teeth 22 of the stator core 20, in other words, before the claw 24 is bent into the arcuate shape, the distal end of the claw 24 is positioned on the rotor 2 side of the distal end of the protrusion 23. In other words, the distal end of the claw 24 is positioned farther than the distal end of the protrusion 23 from the main body 21 of the stator core 20.

In the present embodiment, as shown in FIG. 11B, the protrusion 23 has a distal end surface 231 that is curved so as to lie in an imaginary cylindrical plane C2; the imaginary cylindrical plane C2 is coaxial with the rotor 2.

Moreover, each of the claws 24 has, after being bent into the arcuate shape, a distal end portion falling (or located) on the imaginary cylindrical plane C2. More particularly, in the present embodiment, each of the claws 24 has, after being bent into the arcuate shape, the side surface 241 thereof lying in the imaginary cylindrical plane C2.

Furthermore, in the present embodiment, as shown in FIG. 10, the stator core 20 has a plurality of positioning portions 211 formed in the radially inner surface of the main body 21 of the stator core 20 (or the radially inner surfaces of the core segments 40). Each of the positioning portions 211 has the shape of a notch.

In the jig setting step of the method of manufacturing the stator 10, a jig 130, which has a substantially annular shape as shown in FIG. 10, is set so as to be located radially inside the core segments 40.

More specifically, the jig 130 has a plurality of positioning protrusions 131 formed on a radially outer surface thereof. In the jig setting step, the jig 130 is set (or placed) radially inside the core segments 40 so that each of the positioning protrusions 131 is fitted into a corresponding one of the notch-shaped positioning portions 211 formed in the radially inner surfaces of the core segments 40. Consequently, the core segments 40 are circumferentially positioned with respect to the jig 130.

In addition, in the bending step of the method of manufacturing the stator 10, the core segments 40 are retained by the jig 130 on the opposite side to the teeth 22 with the positioning protrusions 131 of the jig 130 respectively fitted in the positioning portions 211 formed in the radially inner surfaces of the core segments 40.

The above-described stator 10 according to the present embodiment has the same advantages as the stator 10 according to the first embodiment.

Fifth Embodiment

This embodiment illustrates a stator (i.e., armature) 10 which has almost the same structure as the stator 10 according to the first embodiment; accordingly, only the differences therebetween will be described hereinafter.

In the first embodiment, the stator core 20 is comprised of the core segments 40 that are assembled so as to adjoin one another in the circumferential direction of the main body 21 (see FIG. 1); each of core segments 40 is formed by laminating the core pieces 30 in the axial direction of the main body 21 (see FIG. 3). That is, in the first embodiment, the stator core 20 is divided in both the circumferential and axial directions of the main body 21. In addition, in the finally obtained stator core 20, each of the protrusions 311 of the core piece main bodies 31 is fitted in a circumferentially-adjacent one of the recesses 312 of the core piece main bodies 31 (see FIG. 4).

Figure 12:
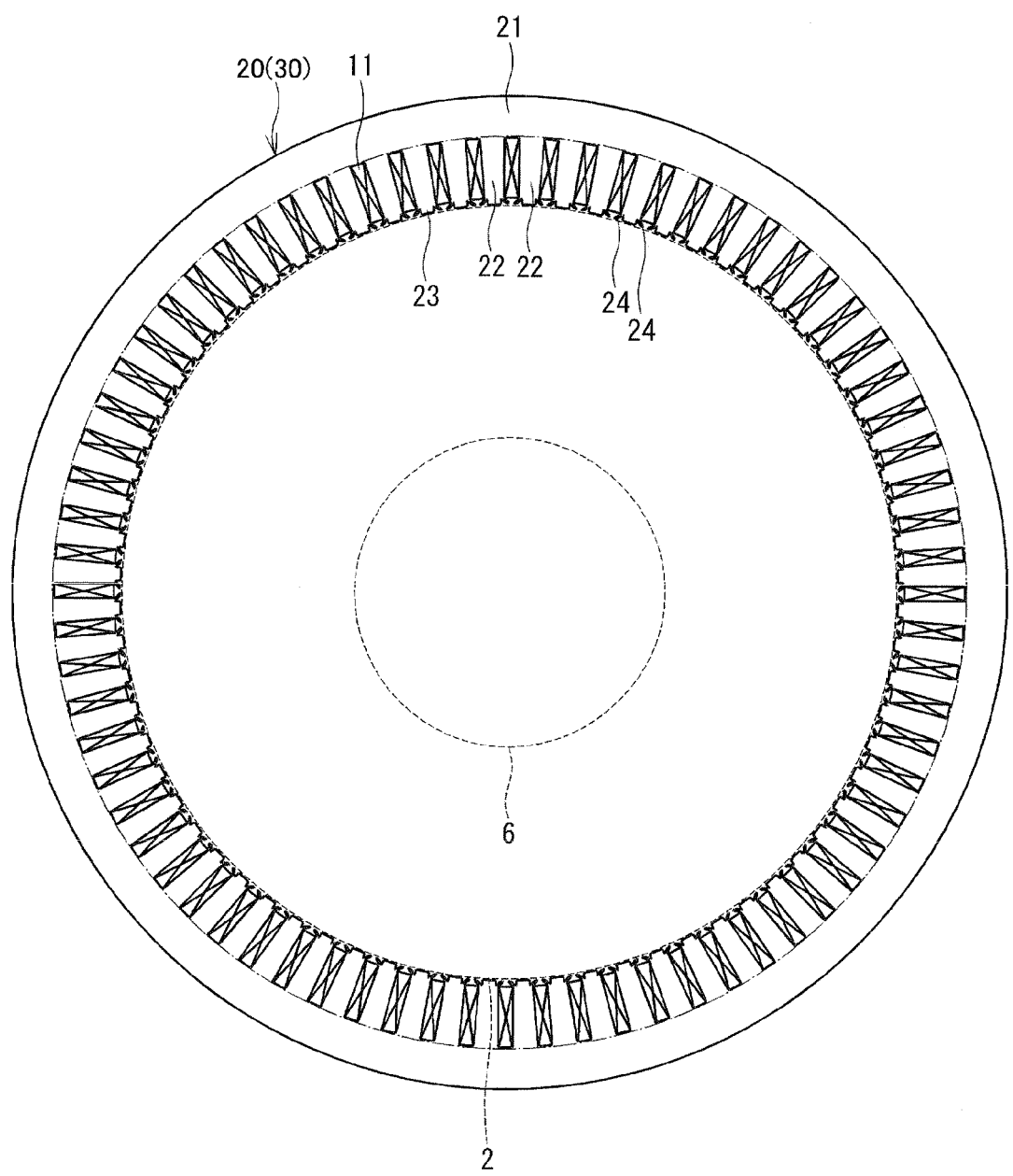
FIG. 12 is a schematic plan view of an armature according to a fifth embodiment.

In comparison, in the present embodiment, the stator core 20 is not comprised of the core segments 40 as in the first embodiment. Instead, as shown in FIG. 12, the stator core 20 is formed by laminating a plurality of annular core pieces 30 in the axial direction of the main body 21. That is, in the present embodiment, the stator core 20 is divided only in the axial direction of the main body 21. In addition, each of the annular core pieces 30 in the present embodiment can be regarded as an integrated body of a plurality (e.g., 36) of the core pieces 30 in the first embodiment; in the integrated body, each of the protrusions 311 of the core piece main bodies 31 is fitted in and integrated into one with a circumferentially-adjacent one of the recesses 312 of the core piece main bodies 31.

Moreover, in the present embodiment, the stator core 20 has no positioning portions 211 formed in the radially outer surface of the main body 21 as in the first embodiment.

In manufacturing the stator 10 according to the present embodiment, the annular core pieces 30 are laminated in the axial direction of the main body 21 to form the stator core 20. Then, the stator coil 11 is arranged between the teeth 22 of the stator core 20. Thereafter, each of the claws 24 of the teeth 22 of the stator core 20 is bent in the circumferential direction away from the protrusion 23, thereby being deformed into the arcuate shape as described in the first embodiment.

The above-described stator 10 according to the present embodiment has the same advantages as the stator 10 according to the first embodiment.

While the above particular embodiments have been shown and described, it will be understood by those skilled in the art that various modifications, changes, and improvements may be made without departing from the spirit of the invention.

For example, in the first embodiment, each of the claws 24 is configured so that before the stator coil 11 is arranged between the teeth 22 of the stator core 20, in other words, before the claw 24 is bent into the arcuate shape, the distal end of the claw 24 is positioned on the rotor (i.e., field) 2 side of the distal end of the protrusion 23.

However, each of the claws 24 may also be configured so that before the stator coil 11 is arranged between the teeth 22 of the stator core 20, the distal end of the claw 24 is positioned on the opposite side of the distal end of the protrusion 23 to the rotor 2. In other words, the distal end of the claw 24 may be positioned closer than the distal end of the protrusion 23 to the main body 21 of the stator core 20.

In the first embodiment, the stator core 20 is obtained by assembling the core segments 40 each of which is formed by laminating the core pieces 30 in the axial direction of the main body 21. That is, in the first embodiment, the stator core 20 is divided in both the circumferential and axial directions of the main body 21.

However, the stator core 20 may be formed, for example by casting or cutting, into one piece. In this case, the stator core 20 is divided neither in the circumferential direction nor in the axial direction of the main body 21.

Alternatively, the stator core 20 may be obtained by assembling a plurality of core segments 40 each of which is formed, for example by casting or cutting, into one piece. In this case, the stator core 20 is divided only in the circumferential direction of the main body 21.

In the first embodiment, each of the protrusions 23 of the teeth 22 of the stator core 20 has the distal end surface 231 curved so as to lie in the imaginary cylindrical plane C1. However, the distal end surface 231 may have other shapes. For example, the distal end surface 231 may be flat in shape (i.e., not curved).

In the first embodiment, each of the claws 24 of the teeth 22 of the stator core 20 is configured to have its distal end portion falling on the imaginary cylindrical plane C1. However, each of the claws 24 may be configured to have its distal end portion not falling on the imaginary cylindrical plane C1.

In the first embodiment, the number of the teeth 22 of the stator core 20 is set to 72. However, the number of the teeth 22 may be set to any other suitable natural number greater than or equal to 2.

In the third embodiment, each of the core segments 40 has a pair of the positioning portions 211 formed in the radially outer surface thereof (see FIG. 9). Moreover, the number of the core segments 40 is set to 36. Accordingly, the total number of the positioning portions 211 formed in the radially outer surface of the main body 21 of the stator core 20 is equal to 72.

However, the number of the positioning portions 211 formed in the radially outer surface of the main body 21 of the stator core 20 may be set to any suitable natural number. Furthermore, the stator core 20 may also have no positioning portion 211 formed in the radially outer surface of the main body 21.

In the first embodiment, the armature is embodied the stator 10 while the field is embodied as the rotor 2. However, it is also possible to embody the armature as a rotor by using brushes while embodying the field as a stator.

In the first embodiment, the invention is applied to the armature (i stator) for the rotating electric machine 1 which is configured as a motor-generator for use in a hybrid vehicle. However, the invention can also be applied to armatures for other rotating electric machines, such as electric motors and electric generators.

What is claimed is:

1. An armature for a rotating electric machine, the armature comprising:
   an armature core including a substantially annular main body to be disposed in radial opposition to a rotor of the rotating electric machine, the armature core also including a plurality of teeth each extending from the main body radially toward the rotor and spaced from one another in a circumferential direction of the main body; and
   an armature coil arranged between the teeth of the armature core,
   wherein
   for each of the teeth of the armature core, there are formed a protrusion and a pair of claws at a distal end of the tooth,
   the protrusion protrudes from a circumferentially central part of the distal end of the tooth radially toward the rotor and toward a rotating shaft that rotates together with the rotor, the claws extend, respectively on opposite circumferential sides of the protrusion, from the distal end of the tooth toward the rotor, each of the claws has a smaller width at its distal end than at its proximal end and is arcuate-shaped so as to engage with and thereby retain the armature coil, the protrusion has a distal end surface that is curved so as to lie in an imaginary cylindrical plane, the imaginary cylindrical plane being coaxial with a center of rotation of the rotor, and each of the claws has a distal end portion falling on the imaginary cylindrical plane.

2. The armature as set forth in claim 1, wherein each of the claws is configured to extend straight parallel to the protrusion before the armature coil is arranged between the teeth of the armature core, and each of the claws is bent, after the arrangement of the armature coil, in the circumferential direction away from the protrusion, thereby being deformed into the arcuate shape.

3. The armature as set forth in claim 2, wherein each of the claws is configured so that before the armature coil is arranged between the teeth of the armature core, the distal end of the claw is positioned farther than a distal end of the protrusion from the main body of the armature core.

4. The armature as set forth in claim 1, wherein the armature core is formed by laminating a plurality of core pieces, each of which is made of a metal sheet, in an axial direction of the main body.

5. The armature as set forth in claim 1, wherein circumferential gaps separate the distal end surface of the protrusion from the distal end portions of each of the claws.

6. The armature as set forth in claim 5, wherein the protrusion has circumferential surfaces being separated from each of the claws by the circumferential gaps separating the distal end surface of the protrusion from the distal end portions of each of the claws, the protrusion being configured such that the circumferential surfaces do not change after the claws are bent in the circumferential direction away from the protrusion.

* * * * *